United States Patent [19]

Hall et al.

[11] 4,021,021
[45] May 3, 1977

[54] WETTER FOR FINE DRY POWDER

[75] Inventors: James E. Hall; Everett H. Williams, both of Oak Ridge, Tenn.

[73] Assignee: The United States of America as represented by the United States Energy Research and Development Administration, Washington, D.C.

[22] Filed: Apr. 20, 1976

[21] Appl. No.: 678,566

[52] U.S. Cl. ..................................... 259/8; 259/95
[51] Int. Cl.² ...................... B01F 7/22; B01F 5/12
[58] Field of Search ................ 259/8, 7, 23, 24, 43, 259/44, 95, 96, 97, 122, 5, 6, 21, 22, DIG. 30; 261/83, 84

[56] References Cited
UNITED STATES PATENTS

| | | | |
|---|---|---|---|
| 2,530,814 | 11/1950 | Becze .................................... | 259/97 |
| 3,129,066 | 4/1964 | Ambrogi .............................. | 259/97 |
| 3,189,080 | 6/1965 | Overcashier ......................... | 259/97 |
| 3,257,174 | 6/1966 | Fournel ................................ | 259/8 |
| 3,532,327 | 10/1970 | Landberg ............................ | 259/95 |
| 3,893,655 | 7/1975 | Sandiford ............................ | 259/95 |

*Primary Examiner*—Robert W. Jenkins
*Attorney, Agent, or Firm*—Dean E. Carlson; David S. Zachry; Stephen D. Hamel

[57] ABSTRACT

A system for wetting fine dry powders such as bentonite clay with water or other liquids is described. The system includes a wetting tank for receiving water and a continuous flow of fine powder feed. The wetting tank has a generally square horizontal cross section with a bottom end closure in the shape of an inverted pyramid. Positioned centrally within the wetting tank is a flow control cylinder which is supported from the walls of the wetting tank by means of radially extending inclined baffles. A variable speed motor drives a first larger propeller positioned immediately below the flow control cylinder in a direction which forces liquid filling the tank to flow downward through the flow control cylinder and a second smaller propeller positioned below the larger propeller having a reverse pitch to oppose the flow of liquid being driven downward by the larger propeller.

8 Claims, 2 Drawing Figures

WETTER FOR FINE DRY POWDER

BACKGROUND OF THE INVENTION

Water treatment plants for providing portable water in this country have traditionally used alum as a settling agent when removing solid impurities from raw water. The enactment and implementation of water pollution controls has given rise to severe problems associated with the disposal of alum residue from such plants. As a result, a recently developed alternative process for removing water contaminants may eventually replace the alum process. The alternative process, generally referred to as the clay-polymer process, is desirable in that the residue which is generated by the process has desirable characteristics as a soil builder and reconditioner and, as such, presents essentially no environment pollution or disposal problems.

In order to use the aforementioned clay-polymer process, it is necessary to wet substantial quantities of extremely fine clay powder with water. The water-clay mixture resulting from the wetting operation is then aged to swell and thus maximize the surface area and mass of individual clay particles before being injected into the raw water entering the water plant. A suitable polymer is subsequently injected and the raw water directed to a settling tank.

In practice, it has been found extremely difficult to wet the fine clay powder with water without excessive particle agglomeration. Such agglomeration tends to reduce the efficiency of the clay-polymer process since it effectively reduces the total surface area of the clay powder relative to a system where all individual particles of powder are wet and uniformly dispersed in the water.

It is, accordingly, a general object of the invention to provide a wetter whereby extremely fine powders may be uniformly and thoroughly wetted with liquids such as water.

SUMMARY OF THE INVENTION

An improved powder wetter is provided for wetting fine dry powders with liquids without excessive powder agglomeration. A wetting tank having a substantially square horizontal cross section and a bottom end closure in the shape of an inverted pyramid is provided with a vertically oriented, open-ended flow control cylinder supported centrally within the wetting tank by means of upper and lower mixing baffles extending from the outer wall of the flow control cylinder to the inner wall of the wetting tank. Larger and smaller shaft mounted propellers driven by a variable speed motor are positioned below and coaxially with the flow control cylinder with the larger propeller being positioned immediately adjacent the bottom of that cylinder and the smaller propeller being displaced below the larger propeller. The larger propeller is driven in a direction which forces liquid filling the tank to flow downward through the flow cylinder while the small propeller is pitched in the opposite direction to oppose the flow driven by the larger propeller. Dry powder and inlet water are fed continuously to the wetting tank and a mixture of wetted powder and water removed continuously during normal operation. The rates of inlet water addition and removal of the mixture of wetted powder and water are low compared to the flow rates of liquid within the wetting tank through the control cylinder so that the residence time of water and powder within the wetting tank is long enough to ensure that it passes repeatedly through the control cylinder past the propellers before being removed and passed to an aging tank.

PREFERRED EMBODIMENT

Figure 1:
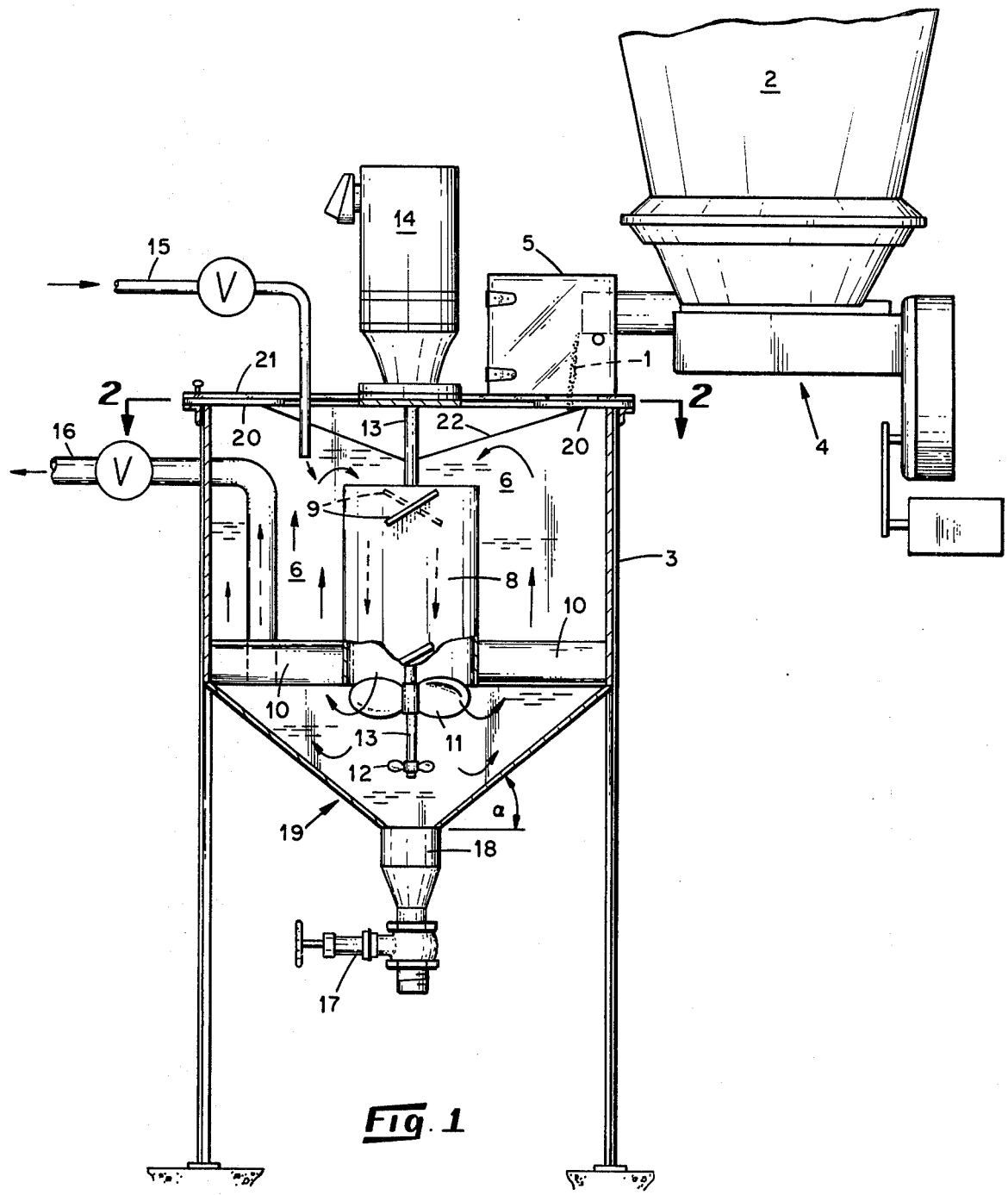
FIG. 1 is a vertical section view of a clay feeder and wetting system made in accordance with the invention.
Figure 2:
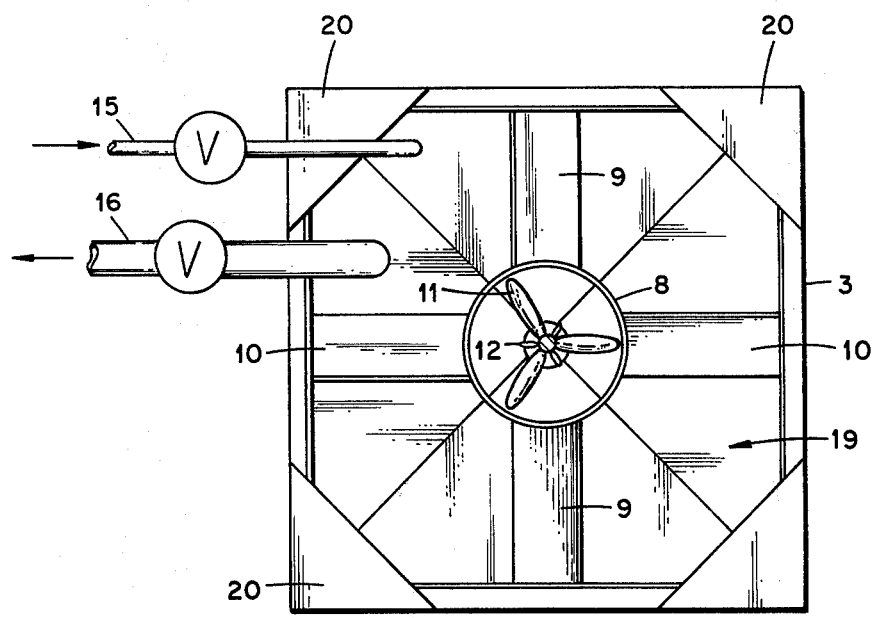
FIG. 2 is a top plan view of the wetting tank and internal components used in the wetting system of FIG. 1

Referring now to the drawings, initially to FIG. 1 where a clay feeder and wetting system used in a water treatment plant is described schematically, a fine stream of clay powder 1 is fed in a continuous controlled stream from a clay hopper 2 to wetting tank 3 by means of a conventional flexible feeder unit 4. The feeder unit is provided with a variable speed controller to pace a screw feeder which continuously dumps powder through sample access enclosure 5 onto the surface of water 6 in wetting tank 3. An open ended flow control cylinder 8 is supported centrally within the wetting tank 3 by means of radially extending upper and lower mixing baffles 9 and 10 which are positioned 180° apart at each level, with the baffles in the upper level being displaced 90° relative to the baffles in the lower level as shown in the top plan view of FIG. 2. The upper mixing baffles are inclined about 40° with respect to the horizontal in the side-to-side direction to oppose upflow of liquid in the tank which has a clockwise flow motion component due to the clockwise rotation of larger propeller 11 described below.

As shown, larger and smaller three bladed props 11 and 12 are mounted on a common shaft 13 driven by a variable speed motor 14. The larger propeller 11 is positioned immediately adjacent the bottom end of the flow control cylinder 8 while the smaller propeller 12 is displaced axially below the larger propeller. A six inch spacing between the propellers has been found to be suitable in a particular embodiment. The larger propeller 11 is pitched to cause liquid to flow downward through the flow control cylinder while the smaller propeller is pitched to oppose the flow created by the larger propeller. This counter-flow action causes a great amount of agitation of the liquid after it passes through the flow control cylinder, thereby contributing to the total mixing and wetting of powder added to the wetting tank. Makeup water or other liquid, depending on the particular process, is continuously added to the mixing vessel through inlet 15 and the clay-water mixture is continuously withdrawn through outlet 16 for transfer to an aging tank. Valve 17 and outlet 18 are provided at the bottom end of an inverted-pyramid-shaped lower end closure 19 to permit draining of the wetting tank for maintenance or cleaning purposes. Baffles 20 are provided at the four top corners of the wetting tank to prevent spillage from the tank. A removable dust cover 21 covers the top of the wetting tank.

In operation, a fine stream of dry clay powder 1 is continuously fed to the top surface 22 of water 6 which is drawn into a vortex as shown in the drawing due to the drain effect of water downflow through flow control cylinder 8. The powder travels radially inward on the surface of the water and is then drawn downward with the water through the flow control cylinder and then outward against opposing flows of liquid propelled by the smaller propeller 12. A clockwise circumferential flow component is also imparted to the flow due to the clockwise rotation of the larger propeller 11. Flow direction is reversed from downward to upward and outward through the interaction of the flow with the inclined sides of lower end closure 19 and with lower baffles 10 which are inclined about 40° with respect to the horizontal to change the circumferential flow component of the mixture to an upward component. The swirling and upflowing water-clay mixture is mixed further through the action of upper baffles 9 which tend to oppose and further agitate the upward and circumferentially flowing mixture as it reaches the top of the wetting tank. The square cross-section of the wetting tank likewise tends to oppose the swirling circular flow of the mixture and increases its turbulence with corresponding improvement in mixing and wetting of the clay powders. Thus, it is seen that the flow within the wetting tank is extremely turbulent and not easily characterized through the addition of sample flow arrows to the drawing. This turbulence is a desirable feature, however, since it is responsible for the thorough wetting of the fine powders which contributes to the overall efficiency of the clay-polymer process.

In order to more fully illustrate the invention, a table of specifications for a particular tested embodiment of the subject wetter designed to wet clay powder for use in a 30 million gallon per day water treatment plant is provided as follows:

| Specifications of Particular Embodiment | |
|---|---|
| Wetting Tank | |
| width | 30 in. |
| overall depth | 33 in. |
| slope α of bottom closure sides | ~45° |
| Control Cylinder | ⅛ in. stainless steel |
| length | 14 in. |
| internal diameter | 9 ½ in. |
| Larger Propeller    3 blade | 9 in. diameter |
| Smaller Propeller    3 blade | 4 in. diameter |
| Mixing Baffles | 4 in. wide |
|  | 40° inclination |
| Method of Operation | batch or continuous |
| Range of Operation | 2-3% clay in liquid by volume with capability to about 20% |
| Rate of Mixture Production with Continuous Operation | 600 Gals/Hr at 2-3% clay by volume |

The above described preferred embodiment of the invention is intended for illustrative purposes only and should not be construed in a strictly limiting sense. For example, although the subject wetter was designed to wet fine clay powders with water as part of a clay-polymer water treatment process, it could be used to wet other powders such as activated carbon with water or other powders with other liquids. Also, the system could operate in a batch rather than a continuous mode if desired. It is intended, rather, that the invention be restricted in scope only by the appended claims.

What is claimed is:
1. A wetter for fine dry powders comprising:
   a. a wetting tank having a square horizontal cross section and a bottom end closure in the shape of an inverted four-sided pyramid for receiving liquid for wetting said powder;
   b. an open ended flow control cylinder disposed centrally within said wetting tank with its longitudinal axis oriented vertically;
   c. a plurality of upper and lower mixing baffles extending between said flow control cylinder and the inner surface of said wetting tank;
   d. a first shaft-mounted propeller disposed immediately below and coaxial with said flow-control cylinder for causing liquid to flow downward through said cylinder;
   e. a second propeller disposed below and on a common shaft with said first propeller, said second propeller being smaller than said first propeller and having a pitch direction opposite to that of said first propeller to oppose the downward flow caused by said first propeller;
   f. means for continuously feeding said fine dry powder into the top of said wetting tank;
   g. means for selectively adding liquid to said wetting tank;
   h. means for selectively removing mixed liquid and wetted powder from said wetting tank; and
   i. means for driving said first and second propellers.
2. The wetter of claim 1 wherein said lower baffles are inclined to force upward flow of liquid between said control cylinder and said wetting tank.
3. The wetter of claim 1 wherein said upper baffles are inclined to oppose upward flow of liquid between said control cylinder and said wetting tank.
4. The wetter of claim 1 wherein said lower baffles are inclined to force upward flow and said upper baffles are inclined to oppose upward flow of liquid between said control cylinder and said wetting tank.
5. The wetter of claim 4 wherein said upper and lower baffles are each inclined about 40° with respect to the horizontal.
6. The wetter of claim 1 wherein there are two upper and two lower baffles, said upper baffles being positioned to extend radially from said control cylinder at 180° intervals about its periphery, said lower baffles being positioned to extend radially from said control cylinder at 180° intervals about its periphery, said upper baffles being displaced angularly at an angle of 90° with respect to said lower baffles.
7. The wetter of claim 1 wherein said means for continuously feeding said powder into the top of said wetter tank comprises a screw feeder.
8. The wetter of claim 1 wherein said control cylinder and first shaft mounted propeller are selected to provide flow rates of liquid through said cylinder which are large compared to the rate at which mixed liquid and wetted powder are removed from said wetting tank.

* * * * *

UNITED STATES PATENT OFFICE
CERTIFICATE OF CORRECTION

Patent No. 4,021,021               Dated May 3, 1977

Inventor(s) James D. Hall et al.

It is certified that error appears in the above-identified patent and that said Letters Patent are hereby corrected as shown below:

On the title page, Item [73] should be deleted.

Signed and Sealed this

First Day of November 1977

[SEAL]

Attest:

RUTH C. MASON
Attesting Officer

LUTRELLE F. PARKER
Acting Commissioner of Patents and Trademarks